US005212129A

United States Patent [19]
Lomas

[11] Patent Number: 5,212,129
[45] Date of Patent: May 18, 1993

[54] INVERTED BACKMIX COOLERS FOR FCC UNITS

[75] Inventor: David A. Lomas, Barrington, Ill.

[73] Assignee: UOP, Des Plaines, Ill.

[21] Appl. No.: 808,823

[22] Filed: Dec. 17, 1991

[51] Int. Cl.⁵ .................. B01J 29/38; B01J 21/20; B01J 38/32; C10G 11/18
[52] U.S. Cl. .................. 502/43; 165/104.16; 165/104.18; 208/164; 422/144; 502/41; 502/44
[58] Field of Search .................. 502/41–44; 208/164; 165/104.18, 104.16

[56] References Cited

U.S. PATENT DOCUMENTS

| | | | |
|---|---|---|---|
| 2,463,623 | 3/1949 | Huff | 23/288 |
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,596,748 | 5/1952 | Watson et al. | 252/417 |
| 2,862,798 | 12/1958 | McKinney | 23/288 |
| 2,873,175 | 2/1959 | Owens | 23/288 |
| 2,970,117 | 1/1961 | Harper | 252/417 |
| 4,238,631 | 12/1980 | Daviduk et al. | 585/469 |
| 4,353,812 | 10/1982 | Lomas et al. | 252/417 |
| 4,396,531 | 8/1983 | Lomas | 252/417 |
| 4,439,533 | 3/1984 | Lomas et al. | 502/6 |
| 4,591,425 | 5/1986 | Kovach et al. | 208/164 |
| 4,595,567 | 6/1986 | Hedrick | 165/104.18 |
| 4,615,992 | 10/1986 | Murphy | 502/41 |
| 4,881,592 | 11/1989 | Cetinkaya | 165/104.16 |
| 4,923,834 | 5/1990 | Lomas | 502/41 |

Primary Examiner—Paul E. Konopka
Attorney, Agent, or Firm—Thomas K. McBride; John G. Tolomei

[57] ABSTRACT

The provision and operation of backmix coolers is facilitated by a cooler arrangement that has the backmix portion of the cooler in an inverted position. In this position the heat exchange portion of the cooler is located above the source of hot catalyst. Hot catalyst for heat exchange in the cooler enters and leaves the heat exchange zone from below the location of the heat exchange tubes. The inverted position prevents any collection of debris in the bottom of the cooler, eliminates high velocity impingement of fluidizing medium on the tube, and facilitates the incorporation of the cooler in FCC units by avoiding interference with other equipment.

6 Claims, 2 Drawing Sheets

INVERTED BACKMIX COOLERS FOR FCC UNITS

BACKGROUND OF THE INVENTION

1. Field of the Invention

The field of art to which this invention pertains is the cooling of fluidized particles. It particularly relates to the combustion of combustible material from a particulated solid such as fluidizable catalyst which has been at least partially deactivated by the deposition thereon of a combustible material, such as coke and the cooling of such particles in a vessel that is separate and distinct from the vessel in which such combustion takes place. The present invention will be most useful in a process for regenerating coke-contaminated particles of fluidized cracking catalyst, but it should find use in any process in which combustible material is burned from solid, fluidizable particles.

2. Description of the Prior Art

The fluid catalyst cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Coke-contaminated catalyst enters the regenerator and is contacted with an oxygen containing gas at conditions such that the coke is oxidized and a considerable amount of heat is released. A portion of this heat escapes the regenerator with the flue gas, comprised of excess regeneration gas and the gaseous products of coke oxidation. The balance of the heat leaves the regenerator with the regenerated, or relatively coke free, catalyst.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the reaction temperature is by regulating the rate of circulation of catalyst from the regeneration zone to the reaction zone which simultaneously increases the catalyst/oil ratio. That is to say, if it is desired to increase the conversion rate, an increase in the rate of flow of circulating fluid catalyst from the regenerator to the reactor is effected. Inasmuch as the temperature within the regeneration zone under normal operations is considerably higher than the temperature within the reaction zone, this increase in influx of catalyst from the hotter regeneration zone to the cooler reaction zone effects an increase in reaction zone temperature. It has become important for FCC units to have the capability to cope with feedstocks such as residual oils and possibly mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also, high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burned in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure due to an increase in thermal versus catalytic selectivity which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe at about 1400°-1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°-1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

The prior art is replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Daviduk et al. U.S. Pat. No. 4,238,631; Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; Watson U.S. Pat. No. 2,506,123; Lomas U.S. Pat. No. 4,396,531; Lomas et al. U.S. Pat. No. 4,353,812; and Lomas et al. U.S. Pat. No. 4,439,533.

An important consideration in the above FCC processes involving regenerator heat removal is the method of control of the quantity of heat removed. In Harper U.S. Pat. No. 2,970,117 and Huff U.S. Pat. No. 2,463,623, the sole method involves regulation of the rate of flow of regenerated catalyst through external catalyst coolers. This method of heat removal, utilizing external coolers and varying the rate of catalyst circulation through them as the exclusive means of control of the heat exchanger duty, involves the continual substantial changing of the catalyst loading on the regenerator with the associated difficulty or impossibility of maintaining convenient steady state operations. In an improved method of using a remote cooler, disclosed in Lomas et al. U.S. Pat. No. 4,353,812, the heat transfer coefficient across the heat transfer surface is controlled by varying the catalyst density through regulation of fluidizing gas addition. The '812 reference also shows the use of a vent line at the top of the catalyst cooler in addition to a catalyst withdrawal line. U.S. Pat. No. 4,615,992, issued to Murphy, also shows the use of a vent line to transfer relatively catalyst-free gas from the top of a remote catalyst cooler to a regenerator vessel. In both cases the cooler receives a high catalyst flux (catalyst flux is the weight of catalyst flowing through a given cross-section per unit of time) through the standpipe feeding the cooler which prevents a catalyst and air mixture from flowing countercurrently up the standpipe. One method of control that has been purposefully avoided in the operation of most heat removal zones is the circulation rate of cooling medium. In order to prevent overheating and possible failure of the cooling tubes, cooling medium usually circulates through the tubes at a high and constant rate. Therefore, the most common form of catalyst coolers uses a net flow of catalyst through the cooler and for this reason is termed a flow through cooler. Heat transfer in these flow through coolers is controlled by regulating the net flow or inventory of catalyst either alone or in combination with regulation of the fluidization gas addition.

The principle of controlling heat removal with fluidizing gas addition is used in Lomas U.S. Pat. No. 4,439,533 to operate what is herein referred to as a backmixed cooling zone. In a backmixed cooling zone, catalyst to be cooled circulates in and out of a cooler inlet opening without a net transport of catalyst through the cooler. The difference between a flow through cooler operation and a backmix cooler operation is that in the backmix operation all of the catalyst circulation into and out of the cooler is through the same opening whereas in a flow through operation catalyst is transported in at least one direction down the length of the cooler. U.S. Pat. No. 2,492,948, issued to C. V. Berger, depicts a catalyst cooler that communicates with the lower portion of an FCC regenerator and superficially resembles a backmix type cooler; however, Berger is really a flow through type cooler since it receives catalyst through an annular opening, transports catalyst down an internal annular passage, transports catalyst up through a heat transfer passage, and ejects catalyst from a central opening. The addition rate of fluidizing gas to the catalyst is the sole variable for controlling the amount of heat transfer in the backmix type cooler. The fluidizing gas addition rate controls the heat transfer coefficient between the catalyst and the cooling surface and the turbulence within the cooler. More turbulence in the backmix cooler promotes more heat transfer by increasing the interchange of catalyst at the cooler opening and increasing the average catalyst temperature down the length of the cooler. A remote backmix cooler has the advantage of a simple design and is readily adapted to most FCC configurations since it requires a single opening between the regenerator and the cooler. Unfortunately, backmix coolers often have the drawback of lower heat transfer duty in comparison to flow through type coolers, especially in the case of backmix coolers that are horizontally displaced from a regeneration vessel.

Several more recent patents have taught methods of improving the control of backmix coolers. U.S. Pat. No. 4,923,834 issued to Lomas teaches the use of a aeration controlled transfer line to improve the circulation of catalyst around the top of a backmix cooler. The use of a lower backmix cooler in combination with an upper flow through catalyst cooler is shown in U.S. Pat. No. 4,881,592 issued to Cetinkaya.

However all such backmix coolers been arranged with the source of hot catalyst at the top of the cooler and the heat exchange surface of the cooler located below the source of circulating catalyst. This arrangement has several disadvantages. For example a downwardly extending backmix zone collects debris in the bottom of the cooler. Such debris blocks the catalyst flow through the typical tube bundle of the cooler and reduces its available heat exchange duty. In addition aeration gas injected between the heat exchange tubes in a downwardly extended backmix cooler sometimes erodes the tubes by blasting catalyst against the tube wall surfaces. Moreover, in the case of retrofitting catalyst coolers into existing FCC units, a large amount of equipment fills the limited space around the bottom of an FCC unit and leaves little space to extend the lower part of a cooler into such an area.

SUMMARY OF THE INVENTION

It has now been discovered that a backmix cooler can operate at high efficiency in an inverted position. Therefore, in brief summary, this invention is a method and apparatus for operating a backmix type cooler in an inverted position wherein the heat exchange portion of the cooler is above the source of hot catalyst. By locating the cooler above the source of hot catalyst, debris from the fluidized catalyst stream collect in the cooler so that the cooler retains its full heat exchange capacity. With the cooler inverted, the fluidizing gas enters from below the heat exchange bundles and avoids any high velocity catalyst impingement on the tubes. Thus, the inverted cooler eliminates a potential source of tube wall erosion. Furthermore, extending the backmix portion of the cooler upwardly simplifies layout of the cooler on new FCC units and in the retrofitting of the cooler on old FCC units.

Accordingly in one embodiment, this invention is a method for indirectly heat exchanging fluidized catalyst particles with a heat exchange fluid. In this method, a first inventory of fluidized catalyst is maintained in a first contacting zone. Catalyst particles from the first contacting zone flow to a lowermost portion of a vertically-oriented heat exchange zone and particles are withdrawn from the bottom of the heat exchange zone. A fluidizing gas is passed from the lowermost portion of the heat exchange zone upwardly through the heat exchange zone to maintain a relatively dense particle bed above the bottom of the heat exchange zone and to circulate particles from the lowermost portion of the heat exchange zone upwardly and downwardly through the particle bed. The particles are indirectly heat exchanged with the heat exchange fluid in the relatively dense catalyst bed. The fluidizing medium is withdrawn from the heat exchange zone.

In another embodiment, this invention is a process for regenerating coke-contaminated fluidized catalyst particles. The process includes the steps of regenerating catalyst in a regeneration vessel by the combustion of coke, transferring hot catalyst from the regeneration vessel to a lower portion of a vertically extended catalyst cooling vessel, and withdrawing cooled catalyst particles from the bottom of the cooling vessel. Fluidizing gas is passed into the lower portion of the cooling vessel to maintain a relatively dense bed of catalyst in the cooling vessel above the lower portion of the cooling vessel. Catalyst particles are cooled in the dense bed by indirect heat exchange with a plurality of heat exchange tubes. A dilute phase gas stream that comprises the fluidizing medium is withdrawn from an upper portion of the cooling vessel.

In yet another embodiment, this invention is an apparatus for regenerating coke-contaminated fluidized catalyst particles. The apparatus comprises a regeneration vessel and a vertically-oriented catalyst cooler located outside the regeneration vessel. The cooler defines a catalyst inlet that receives catalyst from the regeneration vessel and a catalyst outlet at the bottom of the cooler for discharging catalyst. A plurality of heat transfer tubes extend downwardly from the upper portion of the cooler and are located above the inlet and outlet of the cooler. Means are provided for adding a fluidizing medium to the catalyst cooler at a location below the heat transfer tubes and a vent withdraws fluidizing medium from the upper portion of the catalyst cooler.

Other embodiments of the present invention encompass further details such as process streams and the function and arrangement of various components of the apparatus, all of which are hereinafter disclosed in the following discussion of each of the facets of the invention.

DETAILED DESCRIPTION OF THE INVENTION

Figure 1:
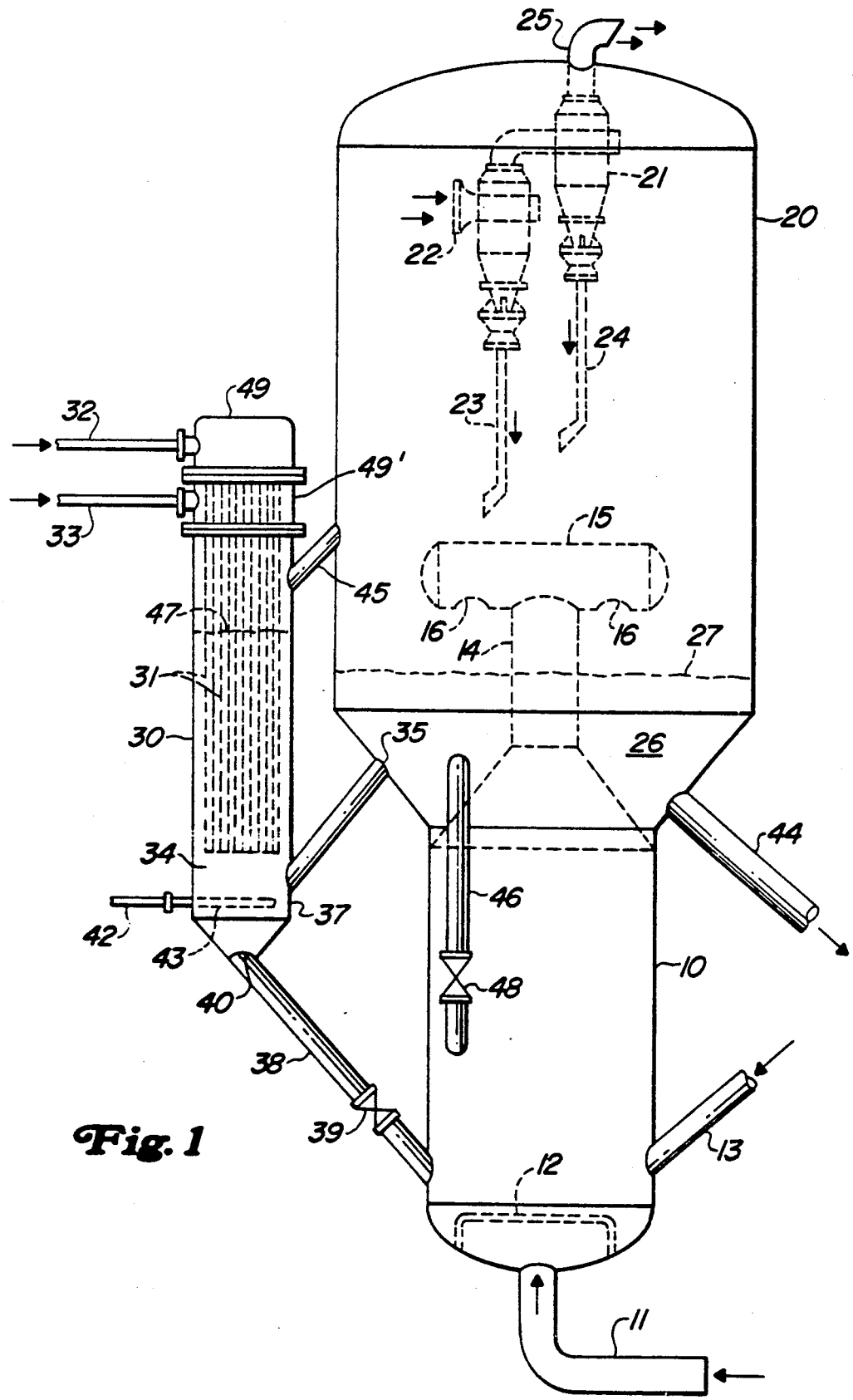
FIG. 1 is a schematic illustration of a regeneration vessel and a heat exchange apparatus incorporating the arrangement of this invention.

The present invention, in its process aspects, consists of steps for the cooling of fluidized particulate materials. An important application of the invention will be a process for the combustion of a combustible material from fluidized particles containing the combustible material, including the step of introducing oxygen containing combustion gas and the fluidized particles into a combustion zone maintained at a temperature sufficient for oxidation of the combustible material. The combustible material will be oxidized therein to produce the first dense phase fluidized bed of hot fluidized particles which are then cooled by the process of the invention. The above combustion zone may be in dilute phase with the hot particles transported to a disengaging zone wherein the hot particles are collected and maintained as the first bed, or the combustion zone may be in dense phase and itself comprise the first bed.

Dense or dilute phase conditions refer to the density of the catalyst and gas mixture in various sections of the FCC process. The actual density of the flowing catalyst and gas mixture will be dependent on both catalyst flux and superficial gas velocity. Dense phase conditions will typically refer to conditions creating a catalyst density of greater than 30 lbs/ft$^3$ and dilute phase conditions refer to a density of less than 20 lbs/ft$^3$. Gas and catalyst mixtures having a density of 20 to 30 lbs/ft$^3$ can be considered either dense or dilute and catalyst densities of at least 20 lbs/ft$^3$ are referred to as relatively dense.

In a particularly important embodiment of the invention, there will be included steps for the regenerative combustion, within a combustion zone, of a coke containing FCC catalyst, from a reaction zone, to form hot flue gas and hot regenerated catalyst, disengagement and collection of the hot regenerated catalyst, cooling of the hot regenerated catalyst in a heat removal or cooling zone, and the use of at least a portion of the cooled regenerated catalyst for control of the temperatures of the catalyst returning to the reaction zone. As used herein, the term "hot regenerated catalyst" means regenerated catalyst at the temperature leaving the combustion zone, usually from about 1300° to about 1400° F., while the term "cool regenerated catalyst" means regenerated catalyst at the temperature leaving the cooling zone, the latter of which is up to 200° F. less than the temperature of the hot regenerated catalyst. The cooling zone is operated in a complete backmix mode wherein the hot regenerated catalyst is continuously circulated through the combustion zone with no net downward movement of catalyst through the cooling zone.

It is known that backmixing can be obtained within the heat exchanger at reasonable superficial gas velocities to circulate catalyst between the cooling zone and disengaging zone. The addition of fluidizing gas or air affects the heat transfer coefficient directly by affecting the superficial velocity over the heat exchanger tubes and indirectly by influencing the extent of mass flow of catalyst from the disengagement zone through the heat exchanger. The higher mass flow will also result in a higher heat exchanger duty because the average catalyst temperature in the heat exchanger will be higher thereby providing a higher temperature difference ($\Delta T$) to which the amount of heat transfer is directly proportional. Additional details on the operation of a backmix cooling zone can be found in U.S. Pat. No. 4,439,533.

Reference will now be made to FIG. 1 for a discussion of the particle heat exchanger and the method of invention. In FIG. 1, regeneration gas, which may be air or another oxygen-containing gas, enters a combustion zone 10 of a regeneration vessel through a line 11, and is distributed by a dome style distribution grid 12. Air leaving the grid mixes with discrete particles of coke-contaminated catalyst entering the combustion zone through a conduit 13. These streams are shown as flowing separately into the combustor zone 10, however, each stream could flow together into a mixing conduit before entering combustion zone 10. Coke-contaminated catalyst commonly contains from about 0.1 to about 5 wt. % carbon, as coke. Coke is predominantly comprised of carbon, however, it can contain from about 3 to about 15 wt. % hydrogen, as well as sulfur and other materials. The regeneration gas and entrained catalyst flows upward in a fluidized state from the lower part of combustion zone 10 to the upper part thereof in dilute phase. Dilute phase conditions, that is, a catalyst/gas mixture of less than 30 lbs/ft$^3$, and typically 2-10 lbs/ft$^3$, are the most efficient for coke oxidation. As the catalyst/gas mixture ascends within combustion zone 10, the heat of combustion of coke is liberated and absorbed by the now relatively carbon-free catalyst, in other words by the regenerated catalyst.

The rising catalyst/gas stream flows through a riser conduit 14 and impinges upon the top of a lateral conduit 15, which impingement changes the direction of flow of the stream and directs the catalyst and gas mixture through outlets 16. The impingement of the catalyst/gas stream upon the surface of conduit 15 and the change of direction through outlets 16 causes most of the hot regenerated catalyst flowing from the combustion zone to disengage from the flue gas and fall to the bottom portion of a disengagement zone 20 which serves as a retention zone for an inventory of particles. More specifically in the case of an FCC unit the disengagement zone comprises a hot particle collection chamber or fluid particle collection section. Although zone 20 is referred to as a disengaging zone, this term also embraces the possibility that additional regeneration or combustion may be carried out in this zone. The catalyst collection area of the disengagement zone may be an annular receptacle, as shown, or any other shape appropriate for collecting catalyst particles. Catalyst in the bottom of the collection zone is maintained as a dense bed 26 having an upper level 27. The gaseous products of coke oxidation and excess regeneration gas, or flue gas, and the uncollected portion of hot regenerated catalyst particles flow up through disengagement zone 20 and enter catalyst/gas separators such as cyclones 21 through an inlet 22. Catalyst particles separated from the flue gas falls from the cyclones to the bottom of disengagement zone 20 through dip legs 23 and 24. The flue gas exits disengagement zone 20 via conduit 25, through which it may proceed to associated energy recovery systems.

Hot catalyst particles are removed from the disengaging zone and transferred to an FCC reactor via a conduit 44 or returned to the combustion zone via conduit 46. A valve 48 regulates catalyst flow-through conduit 46. Catalyst particles are also returned to the combustion zone following passage through a heat removal zone which is also called a cooling zone.

With further reference to FIG. 1, the cooling zone is comprised of a heat exchange zone or heat exchanger 30 having a vertical orientation with the particles or catalyst in the shell side and is often referred to as a catalyst cooler. Lines 32 and 33 supply and recover the heat exchange medium that passes through a tube bundle 31. The preferred heat exchange medium would be water, which, in further preference, would change only partially from liquid to gas phase (steam) when passing through the tubes. It is also preferable to operate the heat exchanger so that the exchange medium is circulated through the tubes at a constant rate. The tube bundle in the heat exchanger will preferably be of the "bayonet" type wherein one end of the bundle is unattached, thereby minimizing problems due to the expansion and contraction of the tubes when exposed to and removed from the high regenerated catalyst temperatures. The heat transfer that occurs is, from the catalyst, through the tube walls, and into the heat transfer medium. A lowermost portion 34 of the heat exchange zone i.e. that section located below the heat exchange tubes 31 and above the bottom 36 of the heat zone receives catalyst from bed 26. Catalyst flows out of bed 26 through an outlet 35 and a transfer pipe 41 and into the lowermost portion of the cooler through a catalyst inlet 37. The primary means of removing catalyst particles from the heat exchange zone is through a catalyst outlet 40 defined by the bottom 36 of the heat exchange zone. A transfer conduit 38 removes catalyst particles from the heat exchange zone through outlet 40 at a rate regulated by a control valve 39. Thus the heat exchanger of this invention has an arrangement wherein essentially all of the addition and removal of catalyst occurs below the heat exchange tubes. Furthermore, since catalyst is supplied and withdrawn from the lowermost portion of the cooler by separate conduits, relatively small diameters are needed for conduits 41 and 38. Therefore, outlet opening 35 requires little space and is easily provided in existing regenerator configurations.

A fluidizing medium, preferably air, is passed into a lower portion of the shell side of heat exchanger 30 via a means for adding the fluidizing medium. In the embodiment of FIG. 1 this means comprises a line 42 and a distributor pipe 43. In other embodiments, the means for adding the fluidizing medium can include several connections or an air grid. The fluidizing medium provides turbulent mixing of the catalyst particles to maintain an at least relatively dense phase fluidized particle bed in the heat exchange zone. A valve (not shown) regulates the flow of fluidizing medium into the heat exchange zone. Regardless of the type of means used to distribute the fluidizing gas to the cooler, such means will have a system for restricting or stopping the flow of fluidizing gas as necessary to suit duty requirements for the heat exchanger. The fluidizing medium effects turbulent backmixing in and throughout the heat exchanger to move catalyst upward and downward through the heat exchange tubes and the lowermost portion of the exchanger. Heat removal, or in other words heat exchanger duty, can also be controlled by adjusting the addition of fluidizing medium through line 43. A higher flow rate will increase heat transfer and raise the exchanger duty.

Fluidizing medium may be added at multiple locations over the length of the heat exchanger. Adding fluidizing gas at different locations allows independent control of exchanger duty over different portions of the heat exchanger. A minimum amount of fluidizing medium is always needed in the lowermost portion of cooler to maintain good catalyst transport through line 41 and out the bottom of the cooler. Preferably all of the fluidizing medium will be added at the bottom of the heat exchange zone in order to prevent concentrated jets of fluidizing medium from accidentally damaging the heat exchange tubes within the heat exchange zone.

A vent removes fluidizing medium from the heat exchange zone at a location above the lowermost portion of the heat exchange zone. FIG. 1 shows a vent 45 located above the top of a bed level 47 in the heat exchange zone. Preferably the vent 45 is located above the normal dense bed level of the heat exchange zone and the particle retention vessel to communicate gas between the dilute phase sections of both zones. Typically the fluidizing medium exiting the heat exchange zone will contain a low concentration of particles. In most FCC operations the density of catalyst particles in the escaping fluidizing medium will typically fall below 20 lb/ft$^3$ and more preferably below 2 lb/ft$^3$.

In addition to affecting the heat exchange duty in the heat exchange zone the addition of fluidizing medium will control the amount of catalyst carried out the heat exchanger through the vent and the height of the bed level in the heat exchange zone. An increase in the amount of fluidizing medium passing through the heat exchange zone reduces the catalyst density. Lower catalyst density expands the catalyst bed which needs additional height to balance the pressure head of catalyst at the catalyst inlet. Therefore, the dense bed level 47 in the cooler can be above the dense bed level 27 in the retention vessel. Increased gas flow also entrains more catalyst with the fluidizing medium as it is vented out of the heat exchange zone; however, the overall amount of catalyst exiting with the vented fluidizing medium usually falls far short of the quantity of catalyst passing through conduit 38.

The tube bundle shown in the exchanger is the preferred bayonet type in which all of the tubes are attached to a single tube sheet. Moreover the tube sheet is preferably located at the top of the heat exchanger with the tubes extending downwardly into the heat exchange vessel. A typical configuration of tubes in the bayonet-type bundle would be one-inch tubes each descending from an inlet manifold 49 in the head of the exchanger down into the shell through a three-inch tube sealed at its top. Each one-inch tube empties into the bottom of the three-inch tube in which it is contained. A liquid, such as water, would be passed down into the one-inch tubes, would empty into the three-inch tubes, would absorb heat from the hot catalyst through the wall of the three-inch tubes as it passed downward through the annular space of the three-inch tubes and would exit the heat exchanger, at least partially vaporized, from outlet manifold 49'.

The backmix mode of the cooling zone operation as practiced in this invention primarily reduces the temperature of catalyst in the disengaging zone. Therefore, this invention also provides a simple means of cooling catalyst in the disengaging zone 20 with the recycle of catalyst to the combustion zone 10.

Although the Figure illustrates a single heat exchanger with associated conduits for circulating catalyst, it should be understood that other configurations are possible, such as two heat exchangers, of the design illustrated, side by side.

Figure 2:
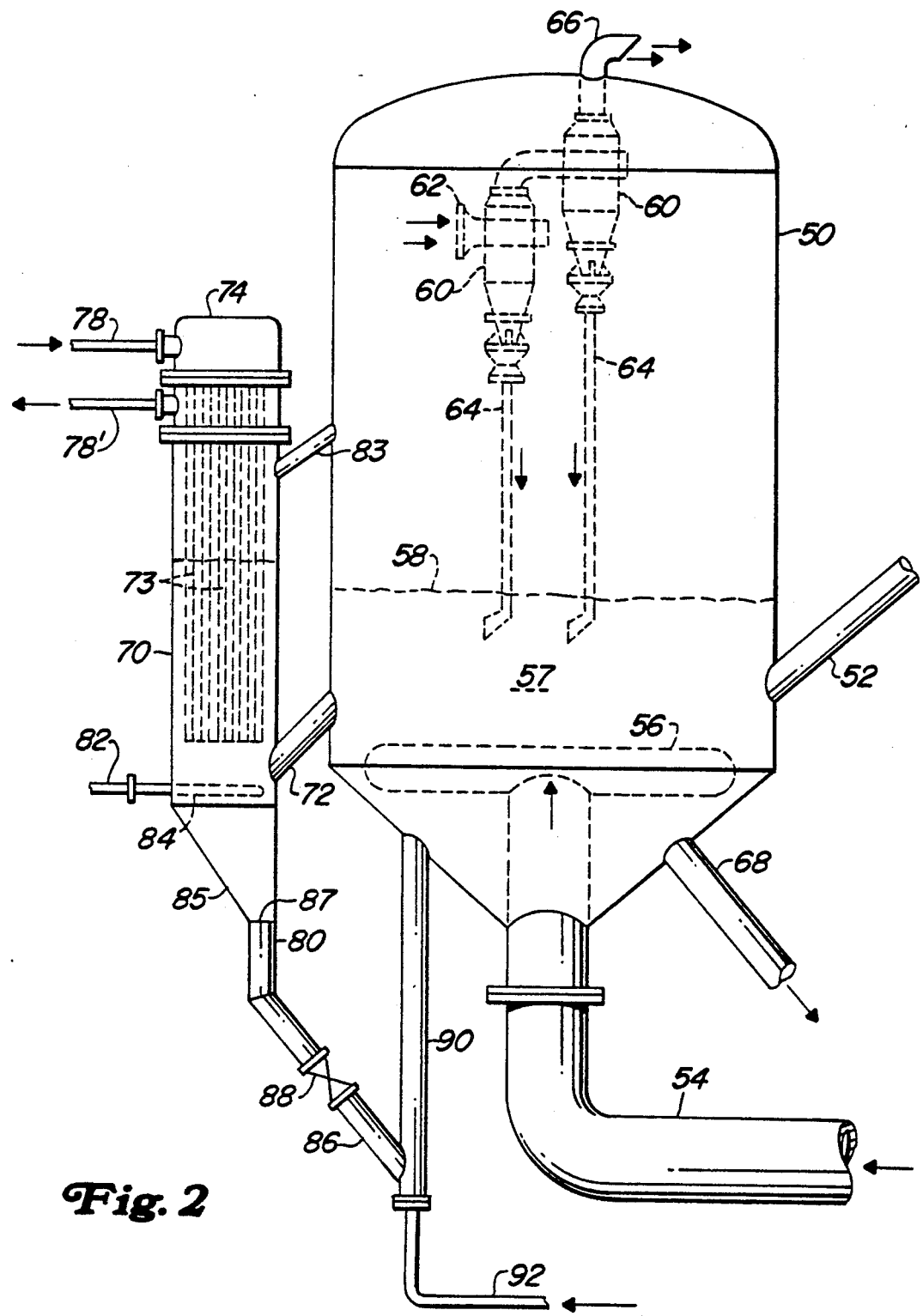
FIG. 2 is a schematic illustration of an alternate regeneration vessel and heat exchange vessel arranged in accordance with this invention.

FIG. 2 shows the particle heat exchanger of this invention in combination with a different type of FCC regenerator. The regenerator has a single chamber in a vessel 50. Spent catalyst containing coke in an amount of from 0.1 to 5 wt. % enters the regenerator through a conduit 52. A lower conduit 54 delivers air to the regenerator which is distributed across the transverse cross-section of the vessel 50 by a distributor 56. Passage of the air through the catalyst oxidizes coke from the surface of the catalyst and maintains the catalyst as a dense fluidized bed 57 having a level 58. Regeneration gas and any catalyst entrained therein is carried upward and enters a pair of cyclones 60 through inlet 62. Cyclone dip legs 64 return catalyst particles to bed 57. A nozzle 66 carries the regeneration gas from cyclones 60 and out of vessel 50. Regenerated catalyst having a reduced coke concentration exits a lower portion of vessel 50 through a conduit 68 and reenters a reaction zone (not shown).

A heat exchanger 70 communicates with catalyst bed 57 through a conduit 72. Heat exchanger 70 operates in substantially the same manner as exchanger 30 shown in FIG. 1 and differs mainly in the regenerator configuration. Exchanger 70 has a plurality of bayonet tubes 73 consisting of an inner tube that receives a heat exchange medium from an inlet manifold 74 and an outer closed end tube that returns the heat exchange medium to an outlet manifold 76. Lines 78 and 78' supply and remove the heat exchange medium from the cooler 70. Fluidization medium enters the exchanger through a pipe 82 and a distributor 84. Fluidizing medium rises from the top 81 of a catalyst bed and a vent 83 transfers the fluidizing medium into the regeneration vessel 50. A conduit 80 takes cool catalyst from the bottom 85 of the heat exchange zone through an outlet 87 at a rate regulated by a control valve 88. Cool catalyst flows out of a conduit 86 into an external riser 90. A line 92 admits fluidization gas into riser 90 which contacts the relatively cool catalyst and transports it back into the dense bed 57.

The heat exchanger of this invention is especially useful in FCC arrangements of the type shown in FIG. 2. In these arrangements, the horizontal portion of line 92 lies very close to the ground elevation. Therefore, the length of the cooler below conduit 72 cannot be increased without raising the entire regeneration vessel 50. This invention locates all of the heat transfer area above conduit 72. Locating the inlet and outlet manifolds at the top of the cooler also facilities removal of the tube bundle by permitting it to be lifted from the top of the exchanger.

What is claimed is:

1. A process for regenerating coke-contaminated fluidized catalyst particles said process comprising:
    a) regenerating catalyst in a regeneration vessel by the combustion of coke;
    b) transferring hot catalyst from the regeneration vessel to an inlet located at a lower locus of a vertically extended catalyst cooling vessel;
    c) withdrawing cooled catalyst particles from the bottom of said cooling vessel;
    d) passing a fluidizing gas into said cooling vessel at or below said lower locus and maintaining an at least relatively dense bed of catalyst particles in said cooling vessel above said lower locus of said cooling vessel;
    e) cooling said catalyst particles in said bed by indirect heat exchange with a plurality of heat exchange tubes located above said lower locus;
    f) withdrawing a dilute phase gas stream comprising said fluidizing medium from an upper portion of said cooling vessel.

2. The process of claim 1 wherein said regeneration vessel comprises the upper vessel of a two stage regeneration process and said cooled catalyst is returned to the lower vessel of said two stage regeneration process.

3. The process of claim 1 wherein said dense bed of catalyst has a density greater than 20 lb/ft$^3$.

4. The process of claim 1 wherein said heat exchange tubes comprise bayonet tubes and said tubes extend downwardly from the top of said cooling vessel.

5. The process of claim 1 wherein said dilute phase gas stream is vented into said regeneration vessel.

6. The process of claim 1 wherein said dilute phase gas stream has a density of less than 20 lb/ft$^3$.

* * * * *